Patented May 14, 1940

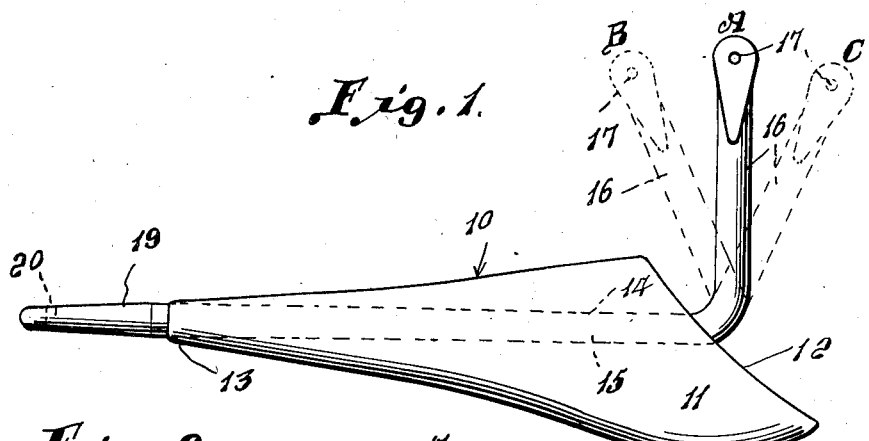
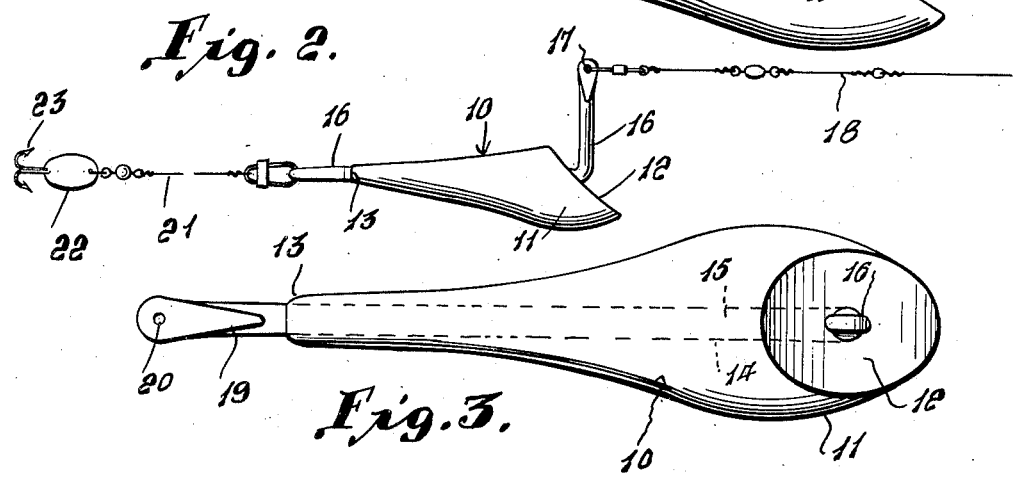
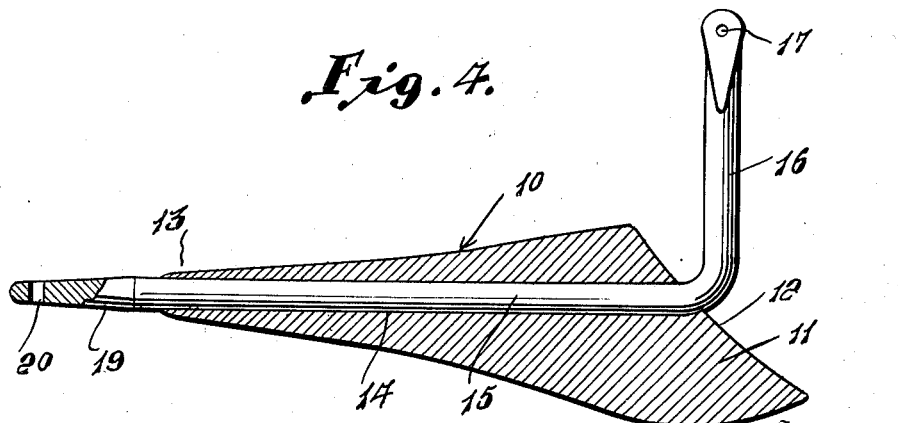

2,201,082

UNITED STATES PATENT OFFICE 2,201,082

TROLLING SINKER

Joe Dobbins and Charles F. Hacker, Pensacola, Fla.

Application September 1, 1938, Serial No. 228,034

5 Claims. (Cl. 43—52)

This invention relates to an improved trolling sinker adapted for use for either deep or shallow trolling.

It is a primary object of this invention to provide a trolling sinker of a given weight which at a constant speed may be caused to move at different depths through the water.

Another object of the invention is to provide a trolling sinker which will not revolve when in use to unravel the fishing line to which it is connected.

More particularly, it is an aim of this invention to provide a sinker having an enlarged head beveled and inclined on its upper and forward side and end, respectively, to normally direct the sinker downwardly and a rod projecting outwardly and upwardly from said forward end to be connected at its free end to a fishing line, the angle of said rod relatively to the sinker being variable to vary the depth at which the sinker will move through the water at a given speed.

A particular advantage of this invention resides in the fact that a sinker of a given weight may be used for either deep or shallow trolling and a lighter sinker may be employed for deep trolling thereby increasing the sport of landing the fish.

Other objects and advantages of the invention will hereinafter become more fully apparent from the following description of the drawing, which illustrates a preferred embodiment thereof, and wherein:

Figure 1 is a side elevational view of the invention,

Figure 2 is a similar view on a reduced scale, illustrating the means whereby a fishing line and a lead line of a lure are attached to the sinker, Figure 3 is a top plan view of the invention, and Figure 4 is a longitudinal central vertical sectional view of the sinker body showing the rod, partly in section and partly in elevation positioned therein.

Referring more particularly to the drawing, wherein like reference characters designate like or corresponding parts throughout the different views, 10 designates generally the body portion of the sinker which is formed of a non-buoyant material such as lead and which is provided with an enlarged forward end or head 11 having an inclined forward and upper face 12 which is preferably slightly concave. The body 10, as best seen in Figures 1 and 3, is substantially circular in cross section and tapers toward its rear end or tail 13. Body 10 is provided with a longitudinal bore 14 having its forward end disposed adjacent the top of said body, so that the preponderance of weight of the head 11 is below the bore, with the forward end of said bore opening outwardly of the face 12.

A rod 15 extends through and is secured in the bore 14 with the forward end 16 thereof extending outwardly and upwardly from the face 12 with an opening 17 formed in its free end for connection, in any conventional manner, with a fishing line 18, as seen in Figure 2. The opposite end 19 of rod 15 projects outwardly from the tail 13 and is provided with the opening 20 adapted to be suitably connected to the lead 21 of a lure or bait 22, provided with the hooks 23.

In Figure 1 end 16 is shown in its full line position, designated A, disposed substantially at right angles to the remaining portion of the rod 15, in its dotted line position designated B, at an acute angle to the remaining portion of rod 15, and in its dotted line position designated C, at an obtuse angle to the remaining portion of the rod. With end 16 in the position A the body 10 will be drawn through the water at a normal depth, while in position B the head 11 will be directed upwardly relatively to the line 18 to cause the body 10 to move close to the surface, at the same speed, while in position C head 11 will be directed downwardly relatively to the line 18 so that the body 10 will submerge to the greatest depth, at the same speed. The inclined face 12, by contact with the water while in motion, will constantly tend to direct this sinker downwardly, this being decreased or increased by the angle of end 16. It will thus be seen that the sinker as illustrated of a predetermined weight and at a constant speed may be caused to move through the water close to the surface, at normal depth, or at a great depth as desired.

It is contemplated to produce the sinkers either with a rod 15 which can be bent so that the angle of the end 16 may be adjusted by the fisherman or to produce the sinkers having the end 16 positioned in either the positions A, B, or C. In the first instance where the fisherman may bend the end 16 the positions A, B, and C will obviously not be constant and the angle of the end 16 may be varied and adjusted to any extent desired, and in fact, where the end 16 is rigid positions A, B, and C are only intended to be illustrative as the various angles of the end 16 will be governed more or less by the trolling speed and the weight of the body 10.

Another advantage of the invention resides in the fact that the line 18 is disposed above the body 10 so that even though swivels are not provided the line 18 will not be unraveled while trolling, because the body 10 being below the line 18 cannot revolve while the line 18 is held taut.

Various modifications and changes are contemplated and may be resorted to, as the drawing and description are only intended to illustrate a preferred embodiment of the invention, and the right is therefore expressly reserved to make such variations and changes as are consistent with the underlying principles of the invention and which do not depart from the spirit and scope of the invention as hereinafter defined by the appended claims.

We claim as our invention:

1. A trolling sinker comprising a non-buoyant body portion, said body portion having an enlarged head and a tail and tapering from its enlarged head to its tail, the forward and upper portion of said head being provided with an inclined concave face to normally direct the body portion downwardly when drawn through the water, a rod projecting outwardly and upwardly from said inclined concave face and adapted to be connected at its upper end to a fishing line, and means projecting from the opposite end of said body portion and adapted to be connected to a lure.

2. A trolling sinker comprising a non-buoyant body portion having an enlarged forward end, said body portion tapering toward its rear end and being provided with a longitudinal bore, a rod disposed in said bore and projecting from the ends thereof, one end of said rod being bent to project upwardly from the forward end of said body portion and having an opening at its free end adapted to be connected to a fishing line to position the body portion substantially below the line, and the opposite end of said rod being adapted to be connected to a lure.

3. A trolling sinker comprising a non-buoyant body portion having an enlarged forward end and provided with a longitudinal bore, said forward end having an inclined upper face for directing the body portion downwardly when drawn through the water, a rod extending longitudinally through said body portion and having one end projecting outwardly through said inclined face adjacent its upper end, said forward end of the rod being bent to extend upwardly to form an arm having an opening at its free end adapted to be connected to a fishing line, and the opposite end of said rod projecting outwardly from the restricted end of the end of the body portion and being provided with an opening adapted to be connected to a lure.

4. A trolling sinker comprising a lead body portion having an enlarged head, said body portion being tapered, the head thereof having an inclined and forward face adapted to direct said body portion downwardly when drawn through the water, and a rod projecting outwardly and upwardly from said inclined face and having an opening at its free end adapted to be connected to a fishing line, said rod being bendable relatively to the body portion to vary the depth of said body portion when drawn through the water.

5. A trolling sinker comprising a body portion having an enlarged head provided with a concave forward and upper face, a rod extending longitudinally through said body and having one end projecting from said face, said end extending upwardly and being provided with an opening in its free end adapted to be connected to a fishing line, and said end being bendable to position it at either an acute angle, right angle or obtuse angle relatively to the remaining portion of said rod to vary the angular position of said body relatively to the line to vary the depth at which it will be drawn through the water at any given speed.

JOE DOBBINS.
CHARLES F. HACKER.